(12) United States Patent
Mashimo

(10) Patent No.: US 10,816,281 B2
(45) Date of Patent: Oct. 27, 2020

(54) COOLING MODULE SUPPORTING STRUCTURE

(71) Applicant: TOYOTA JIDOSHA KABUSHIKI KAISHA, Toyota-shi (JP)

(72) Inventor: Takayuki Mashimo, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 65 days.

(21) Appl. No.: 16/247,823

(22) Filed: Jan. 15, 2019

(65) Prior Publication Data

US 2019/0226772 A1    Jul. 25, 2019

(30) Foreign Application Priority Data

Jan. 24, 2018    (JP) .................. 2018-009858

(51) Int. Cl.
| | |
|---|---|
| *F28F 9/00* | (2006.01) |
| *B60K 11/04* | (2006.01) |
| *F28D 1/04* | (2006.01) |
| *F01P 5/02* | (2006.01) |
| *F28D 21/00* | (2006.01) |

(52) U.S. Cl.
CPC ............. *F28F 9/002* (2013.01); *B60K 11/04* (2013.01); *F28D 1/0426* (2013.01); *F01P 5/02* (2013.01); *F28D 2021/0084* (2013.01); *F28D 2021/0094* (2013.01); *F28F 2275/143* (2013.01)

(58) Field of Classification Search
CPC ..... F28F 9/002; F28F 2275/143; B60K 11/04; F28D 1/0426; F28D 2021/0084; F28D 2021/0094; F01P 5/02

USPC ........................................................... 165/67
See application file for complete search history.

(56) References Cited

U.S. PATENT DOCUMENTS

| | | | |
|---|---|---|---|
| 4,531,574 A * | 7/1985 | Hoch ................. | F01P 11/08 |
| | | | 123/195 A |
| 2004/0069442 A1 | 4/2004 | Yagi et al. | |
| 2012/0273163 A1* | 11/2012 | Ohlhoff ................. | F28F 9/002 |
| | | | 165/104.11 |

FOREIGN PATENT DOCUMENTS

| | | |
|---|---|---|
| JP | 2004-108672 | 4/2004 |
| JP | 2005-106334 | 4/2005 |

* cited by examiner

*Primary Examiner* — David D Hwu
(74) *Attorney, Agent, or Firm* — Oblon, McClelland, Maier & Neustadt, L.L.P.

(57) ABSTRACT

A cooling module supporting structure includes a radiator support in which pin holes are formed on opposite sides in a vehicle width direction, and a cooling module in which pins are mounted in a vertical direction such that the pins protrude from the cooling module. In the cooling module supporting structure, each pin is inserted through corresponding one of the pin holes such that the cooling module is supported by the radiator support. In the cooling module supporting structure, at least one pin hole of the pin holes has a shape extending toward a rear side of a vehicle in the vehicle width direction from a position where the pin is inserted in a state where the cooling module is supported by the radiator support.

5 Claims, 11 Drawing Sheets

COOLING MODULE SUPPORTING STRUCTURE

INCORPORATION BY REFERENCE

The disclosure of Japanese Patent Application No. 2018-009858 filed on Jan. 24, 2018 including the specification, drawings and abstract is incorporated herein by reference in its entirety.

BACKGROUND

1. Technical Field

The present disclosure relates to a supporting structure of a cooling module mounted on a vehicle. In particular, the present disclosure relates to measures to protect the cooling module in the event of a front collision of the vehicle.

2. Description of Related Art

As described in Japanese Patent Application Publication No. 2005-106334 (JP 2005-106334 A), a radiator support is placed at a front end of a body frame of a vehicle. The radiator support supports a cooling module including components such as a radiator.

A support structure of the cooling module of a related art is described below. FIG. 10 is a plan view of a fractured part of a radiator support a and a cooling module b of the related art. In FIG. 10, an arrow FR indicates a front side in a longitudinal direction of the vehicle, an arrow LH indicates a left side in a width direction of the vehicle, and an arrow RH indicates a right side in a width direction of the vehicle. As illustrated in FIG. 10, the radiator support a is provided with a radiator upper support c and a radiator lower support (not illustrated). Pin holes d1 and d2 are formed on opposite sides of the radiator upper support c and the radiator lower support in the vehicle width direction. The pin holes d1 and d2 are round and extend through the radiator upper support c and the radiator lower support in a vertical direction.

The cooling module b integrally includes components such as a radiator e, a condenser f, a blower fan g, and a fan shroud h assembled to each other. Pins i1 and i2 are mounted on an upper surface and a lower surface of the radiator e protruding therefrom. The pins i1 and i2 extend in the vertical direction at positions in correspondence with the pin holes d1 and d2, respectively. The pins i1 and i2 are inserted in the pin holes d1 and d2 via rubber mounts j1 and j2 respectively, such that the cooling module b is supported by the radiator support a. FIG. 11 is a sectional view taken along a line XI-XI in FIG. 10. As illustrated in FIG. 11, the rubber mount j1 is inserted in the pin hole d1 while an outer diameter of the rubber mount j1 is substantially the same as an inner diameter of the pin hole d1. A pin insertion hole k is formed in the rubber mount j1 and the pin i1 is inserted in the pin insertion hole k.

SUMMARY

In a vehicle offset collision test (for example, in an offset rigid barrier (ORB) collision test), as illustrated in FIG. 12, the pin i2 is detached from the pin hole d2 on the side to which impact load is input from a barrier m via a bumper reinforcement o (the left side in FIG. 12, which is the right side of the vehicle). (FIG. 12 illustrates a state where the rubber mount j2 is detached from the pin hole d2 together with the pin i2. However, there are cases where only the pin i2 is detached from the pin hole d2.) In this case, the pin i1 is not detached from the pin hole d1 on the opposite side (on the side to which the impact load is not input, which is the right side in FIG. 12). Therefore, the cooling module b pivots about the pin i1 toward the rear side of the vehicle (see an arrow in FIG. 12).

In the case where the clearance between the side of the cooling module b to which the impact load is input and a part n (hereinafter sometimes referred to as "a part n in an engine compartment") placed behind thereof is relatively small, the cooling module b is sandwiched between the barrier m and the part n in the engine compartment, which may cause the cooling module b to break. In FIG. 12, the fan shroud h of the pivoting cooling module b interferes with the part n in the engine compartment (such as a water pump). The fan shroud h may deform to interfere with the radiator e, which may cause the radiator e to break. In the case where breakage of the radiator e causes leakage of engine coolant, it may be determined that a vehicle cannot run by itself in the test. Thus, a structure that can reduce the occurrence of such a situation has been desired.

The present disclosure provides a cooling module support structure that can protect the cooling module in the event of a front collision of the vehicle.

An aspect of the present disclosure relates to the cooling module support structure. A cooling module supporting structure includes a radiator support in which pin holes are formed on opposite sides in a vehicle width direction, and a cooling module in which pins are mounted in a vertical direction such that the pins protrude from the cooling module. Each pin is inserted through corresponding one of the pin holes such that the cooling module is supported by the radiator support. In the cooling module support structure, at least one pin hole of the pin holes has a shape extending toward a rear side of a vehicle in the vehicle width direction from a position where the pin is inserted in a state where the cooling module is supported by the radiator support.

With this structure, in the event of an offset impact of a vehicle (such as a vehicle offset collision test), in a case where a pin on one side in the vehicle width direction of the pins inserted in each pin hole is detached from the pin hole, the cooling module can move along an extending direction of the pin hole as long as the pin hole where the pin on the other side in the vehicle width direction is inserted has a shape extending toward a rear side of a vehicle in the vehicle width direction. The movement of the cooling module (movement along the vehicle width direction) is a movement in a direction that suppresses interference with the part in the engine compartment, thereby reducing the situation where the cooling module is sandwiched between a colliding object (such as a barrier) and the part in the engine compartment. Thus, breakage of the cooling module caused by being sandwiched between the barrier and the part in the engine compartment can be suppressed, thereby protecting the cooling module.

The pin hole may have a shape extending outward in the vehicle width direction toward the rear side of the vehicle from the position where the pin is inserted in the state where the cooling module is supported by the radiator support.

With this structure, in the event of the offset impact of the vehicle, the cooling module can move in the direction away from the offset impact position in the vehicle width direction as long as the pin hole on the side opposite to the side of the offset impact position has the shape extending outward in the vehicle width direction toward the rear side of the vehicle. Thus, even in the case where the part in the engine compartment is placed closely behind the cooling module on the offset impact side in the vehicle width direction, the interference between the part in the engine compartment and the cooling module can be suppressed, thereby protecting the cooling module.

The pin hole may have the shape extending inward in the vehicle width direction toward the rear side of the vehicle from the position where the pin is inserted in the state where the cooling module is supported by the radiator support.

With this structure, in the event of the offset impact of the vehicle, the cooling module can move in the direction toward the offset impact position in the vehicle width direction as long as the pin hole on the side opposite to the side of the offset impact position has the shape extending inward in the vehicle width direction toward the rear side of the vehicle. In the case where the movement of the cooling module is a movement toward a direction that suppresses the interference with the part in the engine compartment, the interference between the part in the engine compartment and the cooling module can be suppressed, thereby protecting the cooling module.

The pin hole may have a shape that curves with respect to the vehicle width direction toward the rear side of the vehicle from the position where the pin is inserted in the state where the cooling module is supported by the radiator support.

With this structure, a moving amount of the cooling module in the vehicle width direction with respect to the moving amount per unit distance of the cooling module toward the rear side can be varied in the event of the offset impact of the vehicle. Thus, a form of movement of the cooling module can be adjusted as desired.

Each of the pin holes may have a shape extending toward the rear side of the vehicle in directions opposite to each other in the vehicle width direction from the position where the pin is inserted in the state where the cooling module is supported by the radiator support.

This allows the cooling module to move along the vehicle width direction (in the direction away from the offset impact position in the vehicle width direction or in the direction toward a side on which an offset impact is input in the vehicle width direction) regardless of the side on which the impact load is input in the vehicle width direction in the event of the offset collision. Thus, the breakage of the cooling module caused by being sandwiched between the barrier and the part in the engine compartment can be suppressed, thereby protecting the cooling module.

Each of the pin holes may have a shape extending toward the rear side of the vehicle in the same direction in the vehicle width direction from the position where the pin is inserted in the state where the cooling module is supported by the radiator support.

This also allows the cooling module to move along the vehicle width direction regardless of the side on which the impact load is input in the vehicle width direction. Thus, the breakage of the cooling module caused by being sandwiched between the barrier and the part in the engine compartment can be suppressed, thereby protecting the cooling module.

The present disclosure involves the cooling module supporting structure in which the pins mounted on the cooling module protruding therefrom are inserted through the pin holes formed in the radiator support such that the radiator support supports the cooling module. In the cooling module supporting structure, the pin holes have the shape extending toward the rear side of the vehicle in the vehicle width direction from the position where the pins are inserted in the state where the cooling module is supported by the radiator support. Thus, in the event of the offset impact of the vehicle, the pin on one side in the vehicle width direction is detached from the pin hole. The cooling module can move in the vehicle width direction along the extending direction of the pin hole where the pin on the other side in the vehicle width direction is inserted. As a result, the situation where the cooling module is sandwiched between the colliding object (such as the barrier) and the part in the engine compartment can be reduced, thereby protecting the cooling module.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the present disclosure will be described based on the drawings.

Figure 1:
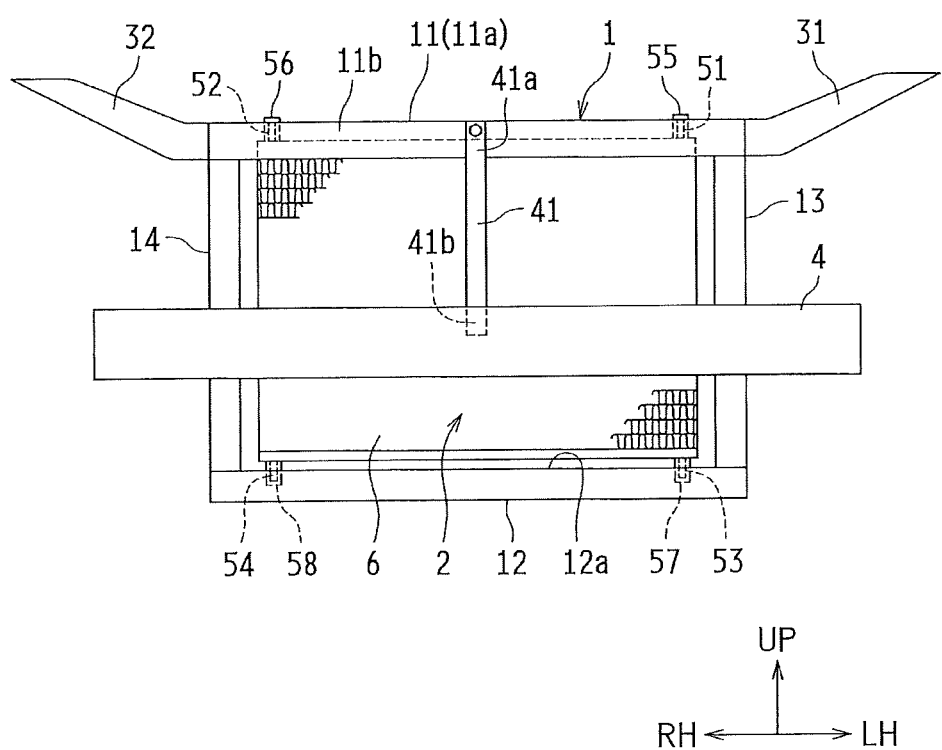
FIG. 1 is a front view of a radiator support and a cooling module.
Figure 2:
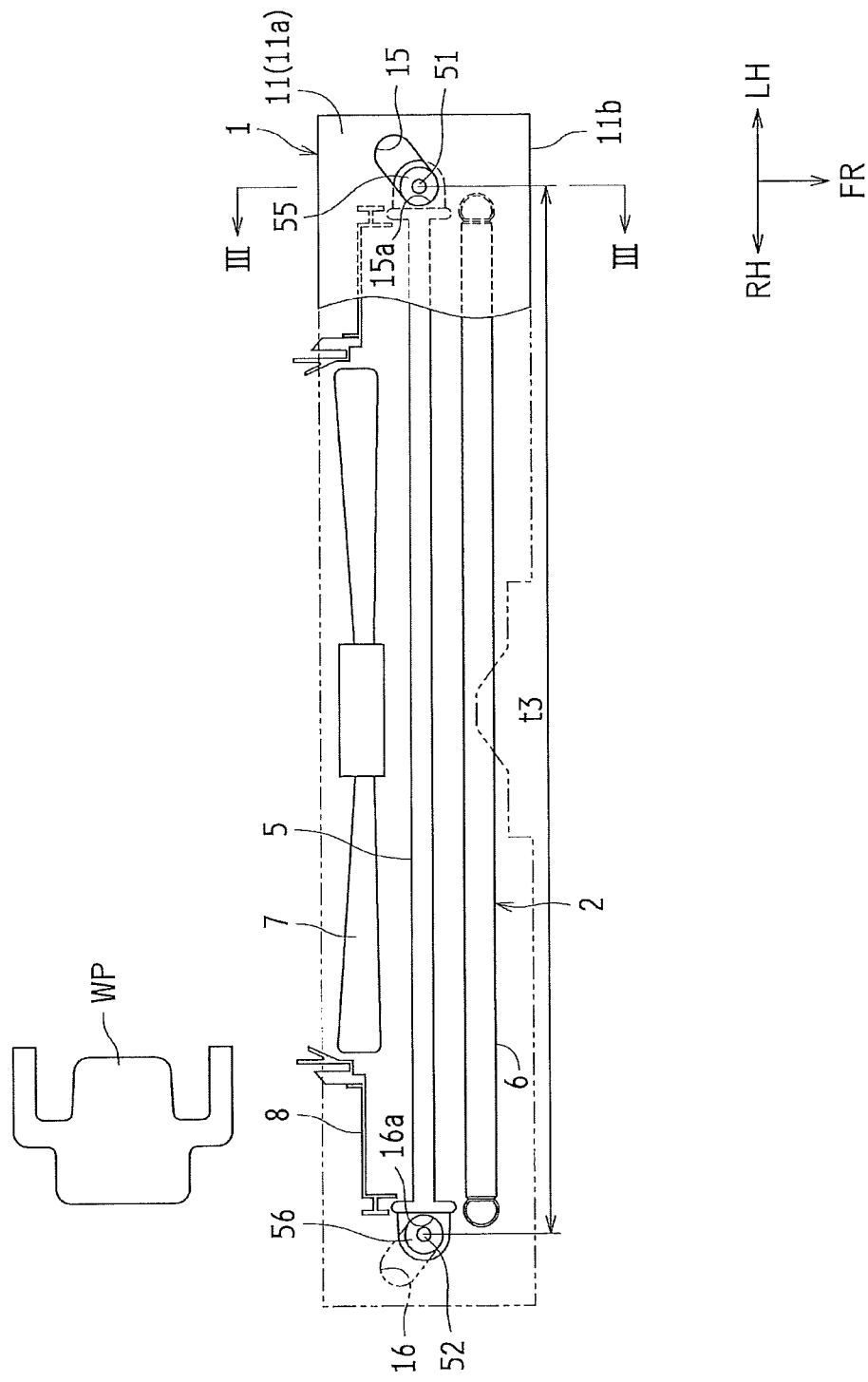
FIG. 2 is a plan view of the radiator support and the cooling module with a part of the radiator support fractured.
Figure 3:
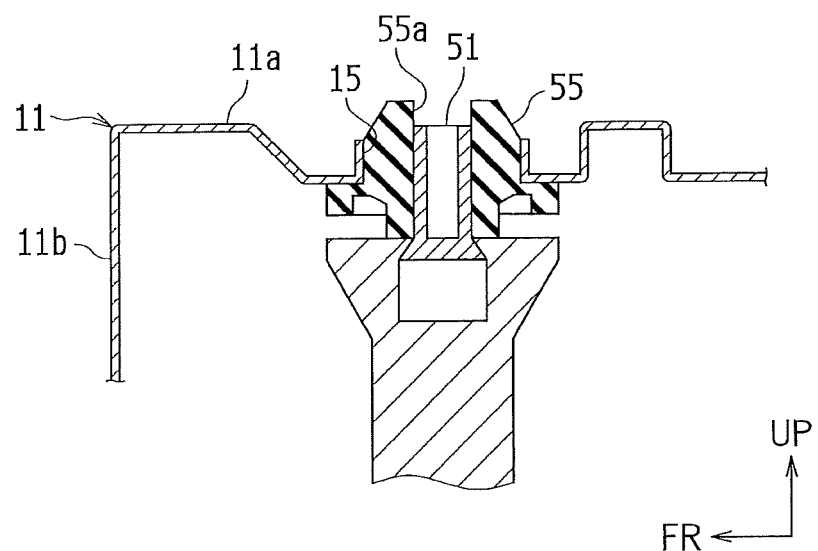
FIG. 3 is a sectional view taken along a line III-III in FIG. 2.

FIG. 1 illustrates a front view of a radiator support 1 and a cooling module 2 according to the present embodiment. FIG. 2 illustrates a plan view of the radiator support 1 and the cooling module 2 according to the present embodiment with a part of the radiator support 1 fractured. FIG. 3 is a sectional view that is taken along a line in FIG. 2. In the drawings, an arrow FR indicates a front side in a longitudinal direction of a vehicle (hereinafter referred to as "vehicle longitudinal direction"), an arrow UP indicates an upper direction, an arrow LH indicates a left side in a width direction of the vehicle (hereinafter referred to as "vehicle width direction"), and an arrow RH indicates a right side in the vehicle width direction.

As illustrated in FIGS. 1 and 2, the radiator support 1 is placed at a front end of a body frame of the vehicle, and the radiator support 1 supports the cooling module 2.

Structure of Radiator Support

The radiator support 1 is formed in a substantially rectangular frame shape as viewed in the front view of the vehicle. The radiator support 1 includes a radiator upper support 11, a radiator lower support 12, and radiator side supports 13, 14. The radiator upper support 11 extends in the vehicle width direction on the upper side. The radiator lower support 12 extends in the vehicle width direction on the lower side of the radiator upper support 11. The radiator side supports 13, 14 form side portions of the radiator support 1 by coupling, in the vertical direction, opposite ends of the radiator upper support 11 and the radiator lower support 12 in the vehicle width direction.

The radiator upper support 11 is a metal member extending in the vehicle width direction, and as illustrated in FIG. 3, includes a horizontal portion 11a extending in a substantially horizontal direction and a vertical portion 11b extending downward from a front end (an end on the front side in the vehicle longitudinal direction) of the horizontal portion 11a. At opposite ends of the horizontal portion 11a of the radiator upper support 11 in the vehicle width direction, pin holes 15, 16 are formed to support the upper portion of the cooling module 2. Shapes of the pin holes 15, 16 will be described later.

Front ends of apron upper members 31, 32 are coupled to opposite ends of the radiator upper support 11 in the vehicle width direction. The end of the radiator upper support 11 on the left side of the vehicle is coupled to the upper end of the radiator side support 13, and the end of the radiator upper support 11 on the right side of the vehicle is connected to the upper end of the radiator side support 14.

The radiator lower support 12 is a metal member placed substantially in parallel with the radiator upper support 11, and for example, the sectional shape thereof has a substantially rectangular, closed sectional structure. Pin holes (not illustrated) supporting the lower portion of the cooling module 2 are formed on the opposite sides of the horizontal portion 12a in the vehicle width direction, the horizontal portion 12a forming the upper surface of the radiator lower support 12. Shapes of the pin holes will also be described later.

The end of the radiator lower support 12 on the left side of the vehicle is coupled to the lower end of the radiator side support 13, and the end of the radiator lower support 12 on the right side of the vehicle is coupled to the lower end of the radiator side support 14.

The radiator side supports 13, 14 are metal members extending in the vertical direction, and for example, the sectional shapes thereof are formed in a substantially U-shape with the inner side of the sectional shape in the vehicle width direction open. The outer side of the radiator side support 13 in the vehicle width direction at the center of the radiator side support 13 in the vehicle vertical direction is coupled to a front side member on the left side of the vehicle via a crash box that is not illustrated. Similarly, the outer side of the radiator side support 14 in the vehicle width direction at the center of the radiator side support 14 in the vehicle vertical direction is coupled to a front side member on the right side of the vehicle via a crash box that is not illustrated.

At the center of the distance between the radiator upper support 11 and the radiator lower support 12 in the vertical direction, and at each of the front ends of the corresponding one of the crash boxes, a bumper reinforcement 4 is placed across the radiator support 1 in the vehicle width direction. The sectional shape of the bumper reinforcement 4 has a substantially rectangular, closed sectional structure.

Between the radiator upper support 11 and the bumper reinforcement 4, a center brace 41 is placed across a part of the radiator support 1 in the vertical direction at the center in the vehicle width direction. The center brace 41 is made of a metal plate having a section in a substantially hat shape, with the section open toward the front, for example. The upper end of the center brace 41 is provided with an attachment portion 41a attached to the radiator upper support 11. The lower end of the center brace 41 is provided with an attachment portion 41b attached to the bumper reinforcement 4.

Structure of Cooling Module

The cooling module 2 is placed inward of the radiator support 1. The cooling module 2 includes components such as a radiator 5, a condenser 6, a blower fan 7, and a fan shroud 8.

The radiator 5 and the condenser 6 are placed side by side in the vehicle longitudinal direction. In the present embodiment, the radiator 5 is placed behind the condenser 6. The condenser 6 causes heat exchange between ambient air introduced from a radiator grill (not illustrated) or the like and refrigerants flowing through an air conditioning unit of the vehicle, and liquefies the refrigerants (refrigerant gases). The radiator 5 causes heat exchange between the ambient air introduced from components such as the radiator grill and engine coolant to cool the engine coolant.

The fan shroud 8 is mounted to the radiator 5 to rectify air that has passed through the radiator 5 toward the blower fan 7. The center of the fan shroud 8 is provided with an electric motor (not illustrated). The blower fan 7 is mounted to a rotating shaft of the electric motor to rotate in correspondence with an operation of the electric motor. The rotation of the blower fan 7 generates an air flow toward the rear side of the vehicle.

The radiator 5, the condenser 6, the blower fan 7, and the fan shroud 8 are integral (one unit), and are supported by the radiator support 1 as one unit (the support structure is described later).

Pins 51, 52, 53, 54 are mounted on the upper surface and the lower surface of the radiator 5 so as to protrude therefrom. The pins 51, 52, 53, 54 extend in the vertical direction at a position corresponding to the pin holes 15, 16. The pins 51, 52, 53, 54 are inserted through the pin holes 15, 16 via rubber mounts 55, 56, 57, 58, such that the radiator 5 is supported by the radiator support 1. Thus, the cooling module 2 is supported by the radiator support 1. As illustrated in FIG. 3, a pin insertion hole 55a is formed in the rubber mount 55. The pin 51 is inserted through the pin insertion hole 55a.

Thus, the pins 51, 52 mounted on the upper surface of the radiator 5 so as to protrude therefrom are inserted through the pin holes 15, 16 formed in the horizontal portion 11a of the radiator upper support 11 via the rubber mounts 55, 56. Accordingly, the upper portion of the cooling module 2 is supported. Similarly, the pins 53, 54 mounted on the lower surface of the radiator 5 so as to protrude therefrom are inserted through the pin holes 15, 16 formed in the horizontal portion 12a of the radiator lower support 12 via the rubber mounts 57, 58. Accordingly, the lower portion of the cooling module 2 is supported.

In the present embodiment, a water pump WP is placed near the cooling module 2 as a part in the engine compartment, in which the cooling module 2 is housed. Specifically, the water pump WP is placed behind the right end of the cooling module 2 in the vehicle width direction. The distance between the front end of the water pump WP and the rear end of the fan shroud 8 is relatively small.

Shapes of Pin Holes

The present embodiment features the shapes of the pin holes 15, 16. As illustrated in FIG. 2, the pin holes 15, 16 according to the present embodiment have a shape extending toward the rear side of the vehicle in the vehicle width direction from the positions where the pins 51, 52, 53, 54 are inserted in a state where the cooling module 2 is supported by the radiator support 1. Specifically, the pin holes 15, 16 extend outward toward the rear side of the vehicle in the vehicle width direction from the positions where the pins 51, 52, 53, 54 are inserted.

Here, the specific shapes of the pins holes 15, 16 are described. The shapes of the pin holes 15, 16 formed in the radiator upper support 11 and the radiator lower support 12 are symmetrical in a lateral direction. Therefore, here, the pin hole 15 provided in the radiator upper support 11 on the left side in the vehicle width direction will be used for description on behalf of the pin hole 16.

Figure 4:
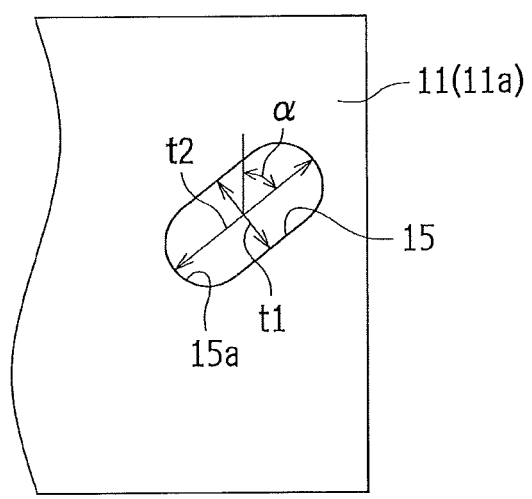
FIG. 4 is a plan view of a pin hole formed in a radiator upper support and its periphery.

FIG. 4 is a plan view of the pin hole 15 and its periphery. The pin hole 15 is one of the pin holes 15 formed in a radiator upper support 11. As illustrated in FIG. 4, the pin hole 15 has an elliptical shape as viewed in the plan view, and a dimension of an opening in a short-axis direction (a dimension t1 in FIG. 4) thereof is substantially the same as an outer diameter of the rubber mount 55. A dimension of an opening in a long-axis direction (a dimension t2 in FIG. 4) of the pin hole 15 is approximately twice as large as the outer diameter of the rubber mount 55. An extending direction of the long axis forms a predetermined angle α with respect to the vehicle longitudinal direction. In the present embodiment, the predetermined angle α is set around 50 degrees. The dimension t2 of the opening in the long-axis direction and the angle α of the pin hole 15 described above are set to values, based on experiments and simulations, such that the cooling module 2 does not interfere with the water pump WP which is the part in the engine compartment in the event of the vehicle offset collision test, as described later.

A distance (a dimension t3 in FIG. 2) between arc centers of arc-shaped inner edges 15*a*, 16*a* on the front side of the pin holes 15, 16 in the vehicle longitudinal direction is substantially the same as a distance (likewise, the dimension t3 in FIG. 2) between the centers of the pins 51, 52. Thus, in a state where the pins 51, 52 are inserted through the pin holes 15, 16, the pins 51, 52 and the rubber mounts 55, 56 are positioned on the front side of the pin holes 15, 16 in the vehicle longitudinal direction. In other words, a part of outer edges of the rubber mounts 55, 56 are brought into abutment with the arc-shaped inner edges 15*a*, 16*a* of the pin holes 15, 16.

Vehicle Offset Collision Test

Next, a movement of the cooling module 2 in the event of the vehicle offset collision test will be described with reference to FIGS. 5, 6A, and 6B. Here, the vehicle offset collision test in which the barrier B collides on the right side of the vehicle in the vehicle width direction is used as an example.

In the vehicle offset collision test, on the right side in the vehicle width direction (on the left side in FIG. 5) where the impact load of the barrier B is input, the cooling module 2 receives the impact load of the barrier B via the bumper reinforcement 4. Therefore, the pins 52, 54 are detached (removed toward the rear side) from the pin hole 16. (FIG. 5 illustrates a state where the rubber mount 56 is detached from the pin hole 16 together with the pin 52. However, there are cases where only the pin 52 is detached from the pin hole 16.)

Figure 5:
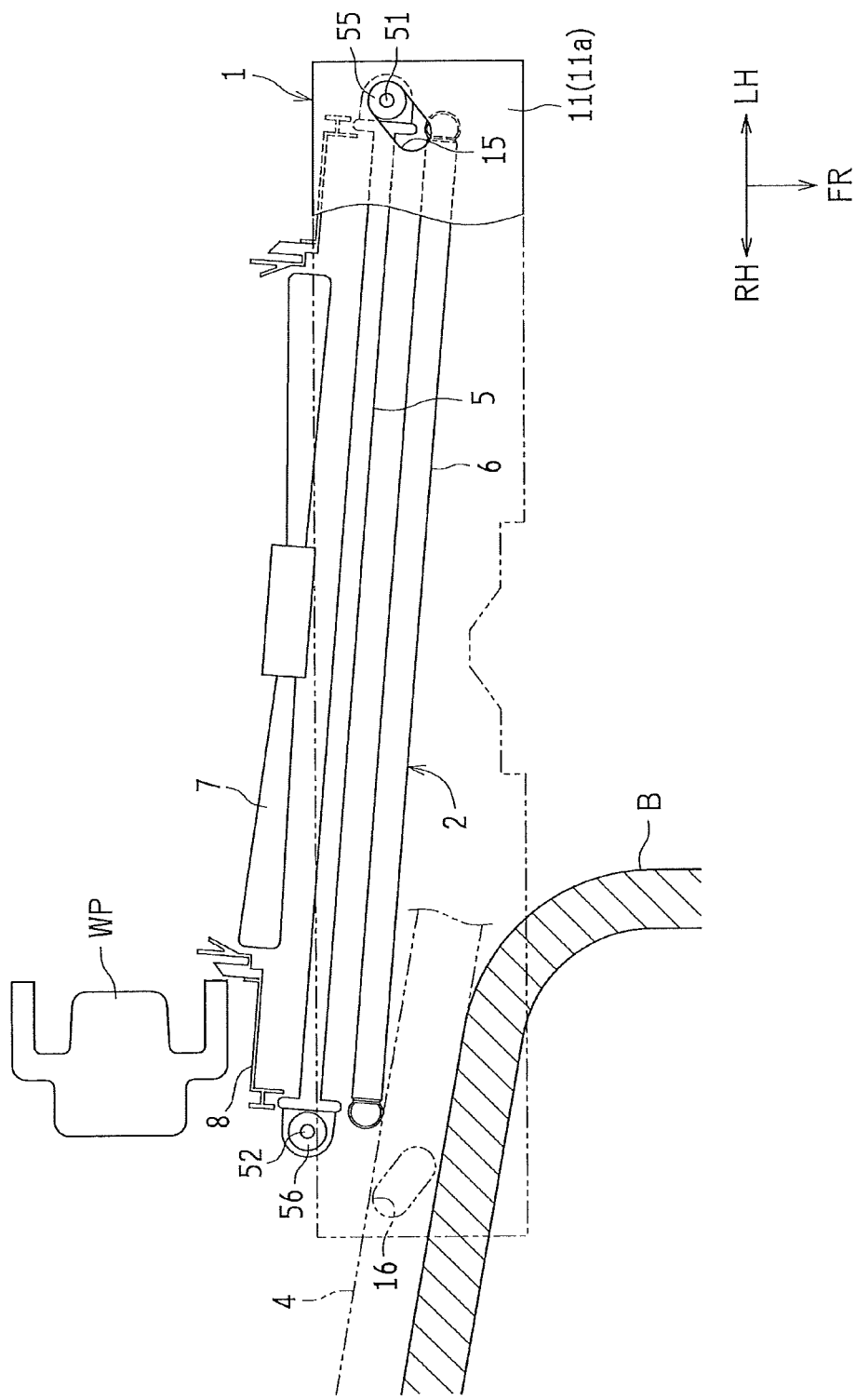
FIG. 5 is a view corresponding to FIG. 2 in the event of a vehicle offset collision test.

In this case, the pins 51, 53 of the cooling module 2 are not detached from the pin holes 15 on the left side in the vehicle width direction (on the right side in FIG. 5, which is the side where the impact load is not input). The pin holes 15 formed on the left side in the vehicle width direction has a shape extending outward in the vehicle width direction toward the rear side of the vehicle. Therefore, the pin 51 moves within the pin hole 15 together with the rubber mount 55, allowing the cooling module 2 to move along the extending direction of the pin hole 15. This enables the cooling module 2 to move along the vehicle width direction (in the right direction in FIG. 5). The movement of the cooling module 2 (movement along the vehicle width direction) is a movement in a direction that suppresses interference with the water pump WP, which is the part in the engine compartment. This can reduce the situation where the cooling module 2 is sandwiched between the barrier B and the water pump WP.

Figure 6A:
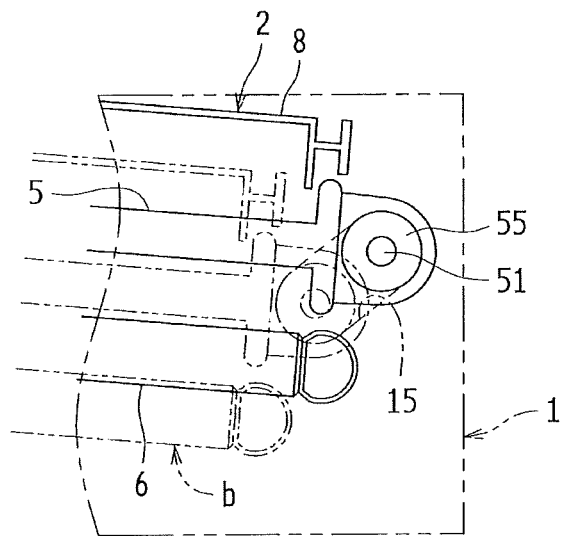
FIG. 6A is an enlarged view of main parts in the event of the vehicle offset collision test.

FIG. 6A is an enlarged view of main parts of the left side of the cooling module 2 in the vehicle width direction. FIG. 6B is an enlarged view of the main parts of the right side of the cooling module 2 in the vehicle width direction.

As illustrated in FIG. 6A, in the event of the vehicle offset collision test, the pill 51 moves along the extending direction of the pin hole 15 together with the rubber mount 55 without being detached from the pin hole 15. A cooling module b represented by imaginary lines in FIG. 6A indicates a posture of the cooling module according to the related art (where the pin hole is a perfect circle) in the event of the vehicle offset collision test.

Figure 6B:
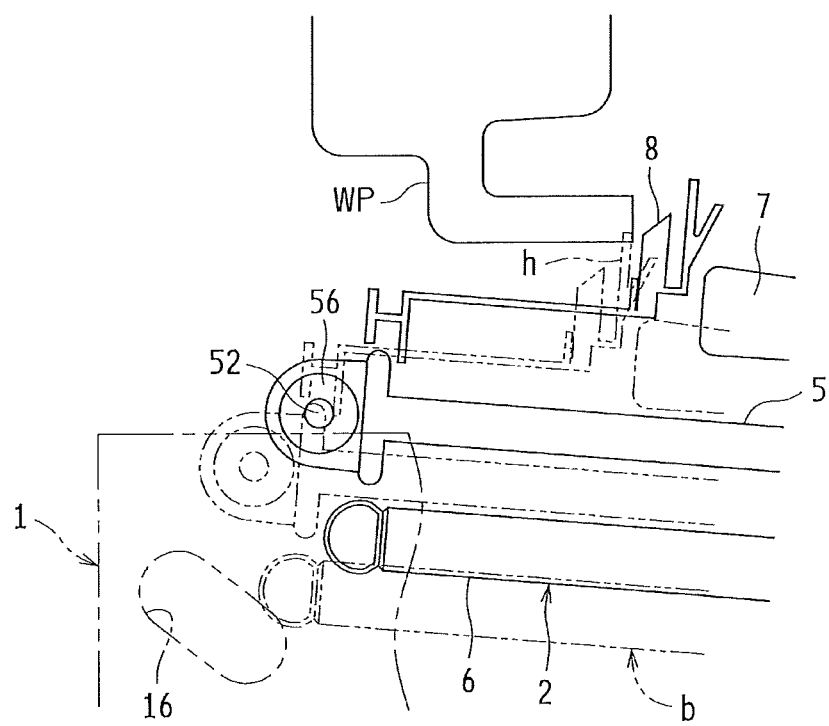
FIG. 6B is an enlarged view of the main parts in the event of the vehicle offset collision test.

As illustrated in FIG. 6B, in the event of the vehicle offset collision test, the fan shroud 8 of the cooling module 2 moves on the left side (on the right side in FIG. 6B) with respect to the water pump WP. This suppresses interference between the fan shroud 8 and the water pump WP. The cooling module b represented by imaginary lines in FIG. 6B indicates a posture of the cooling module according to the related art (where the pin hole is a perfect circle) in the event of the vehicle offset collision test. In this case, a fan shroud h interferes with the water pump WP.

As described above, in the present embodiment, the pin holes 15, 16 have a shape extending outward in the vehicle width direction toward the rear side of the vehicle from the position where the pins 51, 52, 53, 54 are inserted in a state where the cooling module 2 is supported by the radiator support 1. This allows the cooling module 2 to move along the vehicle width direction in the event of the vehicle offset collision test, thereby reducing the situation where the cooling module 2 is sandwiched between the barrier B and the water pump WP. Thus, breakage of the cooling module 2 caused by being sandwiched between the barrier B and the water pump WP can be suppressed, thereby protecting the cooling module 2. This reduces the possibility of leakage of engine coolant due to breakage of the radiator 5, as well as the possibility that it may be determined that the vehicle cannot run by itself in the event of the vehicle offset collision test.

In the present embodiment, the pin holes 15, 16 on both sides in the vehicle width direction have a shape extending outward in the vehicle width direction toward the rear side of the vehicle from the position where the pins 51, 52, 53, 54 are inserted. This allows the cooling module 2 to move along the vehicle width direction regardless of the side on which the impact load is input in the vehicle width direction in the event of the offset collision. In other words, even when the distance between the front end of the part in the engine compartment that is placed behind the left end of the cooling module 2 in the vehicle width direction and the rear end of the fan shroud 8 is relatively small, similar to the above description, the breakage of the cooling module 2 caused by being sandwiched between the barrier B and the part in the engine compartment can be suppressed, thereby protecting the cooling module 2.

First Modification

Figure 7:
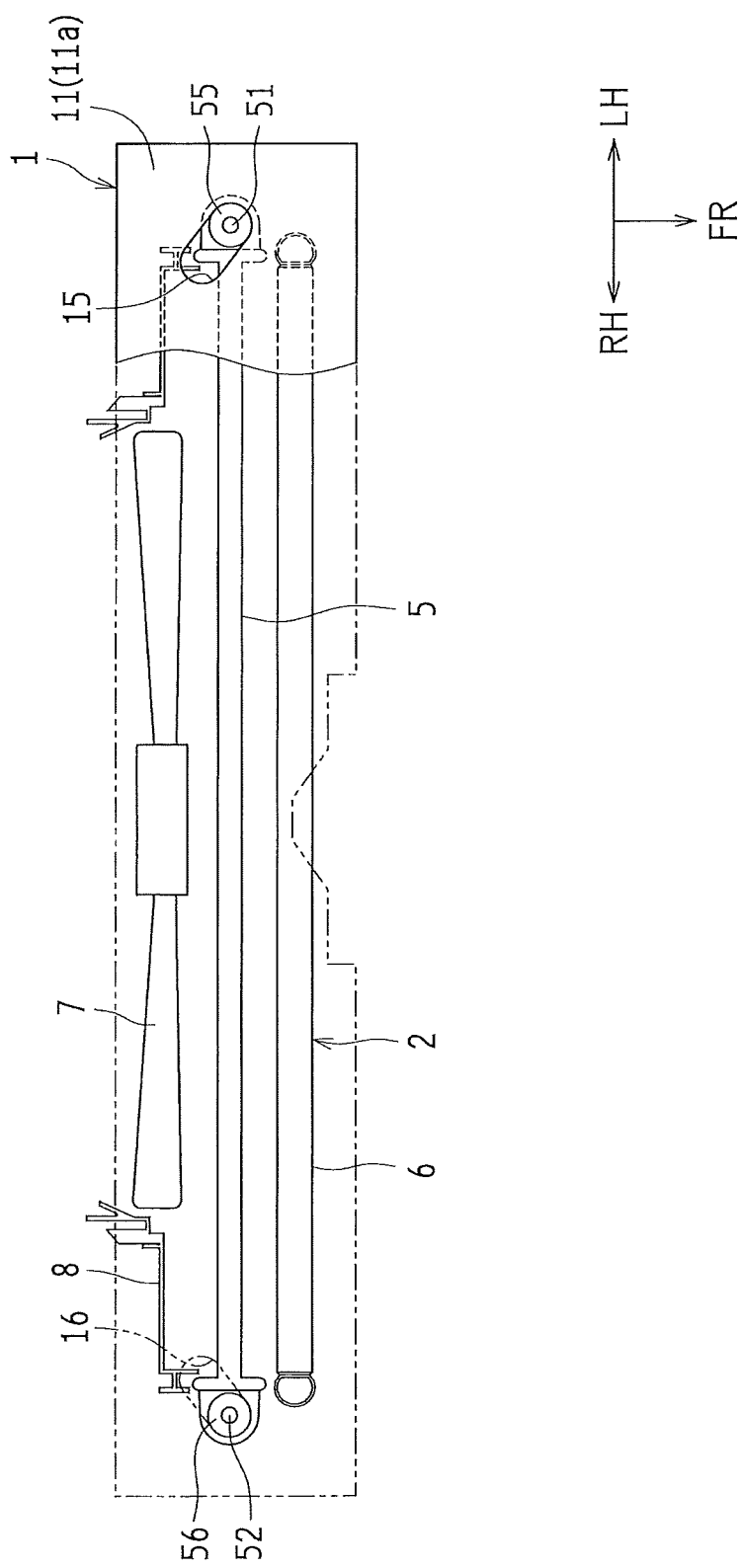
FIG. 7 is a view corresponding to FIG. 2 according to a first modification.

Next, a first modification of the pin holes 15, 16 will be described. In the embodiment described above, the pin holes 15, 16 have a shape extending outward in the vehicle width direction toward the rear side of the vehicle from the position where the pins 51, 52 are inserted in a state where the cooling module 2 is supported by the radiator support 1. In the present modification, as illustrated in FIG. 7, the pin holes 15, 16 have a shape extending inward in the vehicle width direction toward the rear side of the vehicle from the position where the pins 51, 52 are inserted in the state where the cooling module 2 is supported by the radiator support 1.

With this structure, the cooling module 2 can move toward a side on which an offset impact is input in the vehicle width direction in the event of the offset impact of the vehicle. In the case where the movement of the cooling module 2 is a movement toward a direction that suppresses the interference with the part in the engine compartment, the interference between the part in the engine compartment and the cooling module 2 can be suppressed, thereby protecting the cooling module 2.

Second Modification

Next, a second modification of the pin holes 15, 16 will be described. In the present modification, as illustrated in FIG. 8, the pin holes 15, 16 have a shape that curves with respect to the vehicle width direction toward the rear side of the vehicle from the positions where the pins 51, 52 are inserted in the state where the cooling module 2 is supported by the radiator support 1.

With this structure, a moving amount of the cooling module 2 in the vehicle width direction with respect to the moving amount per unit distance of the cooling module 2 toward the rear side can be varied in the event of the offset impact of the vehicle. Thus, a form of movement of the cooling module 2 can be adjusted as desired.

Figure 8:
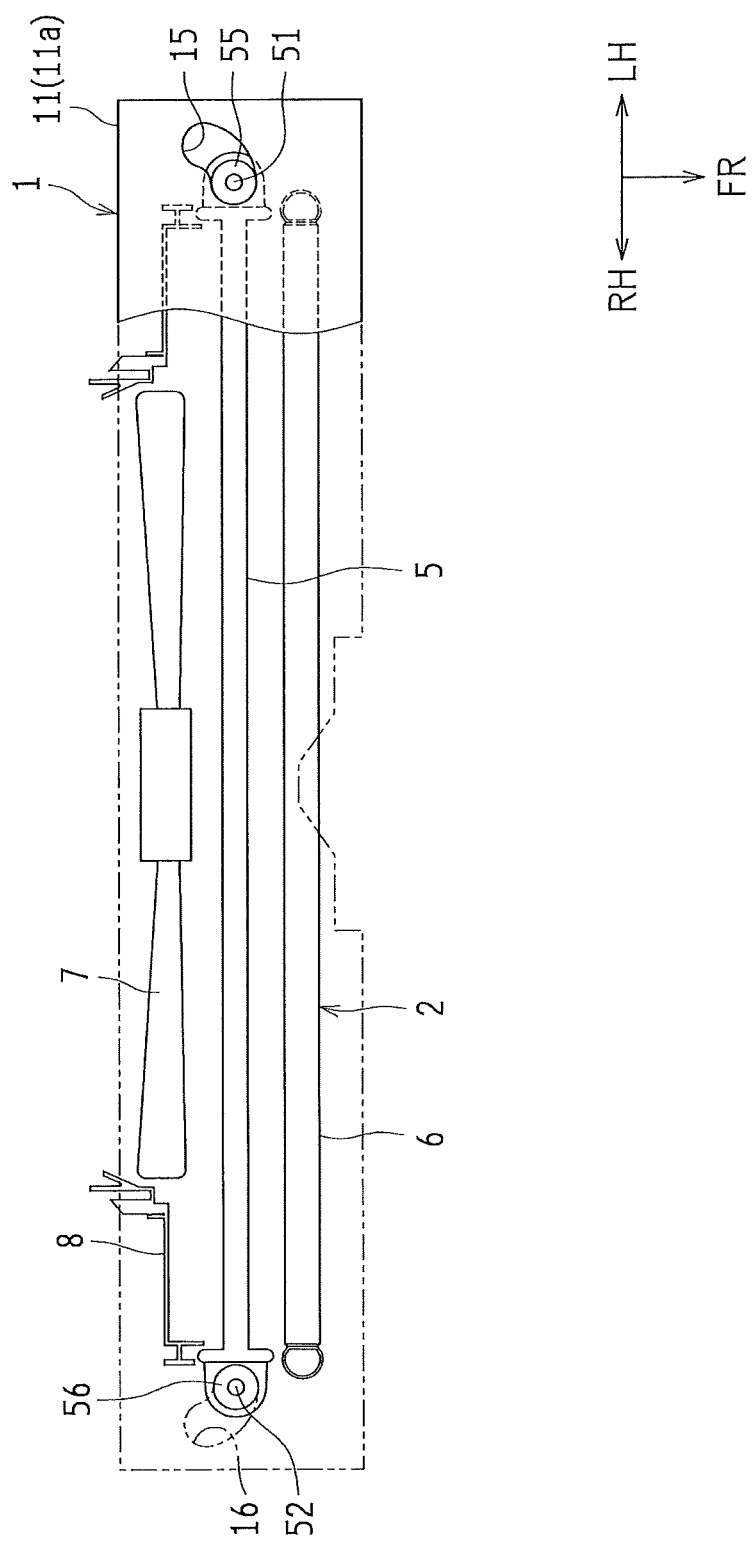
FIG. 8 is a view corresponding to FIG. 2 according to a second modification.

The pin holes 15, 16 illustrated in FIG. 8 have a shape extending outward in the vehicle width direction toward the rear side of the vehicle. However, the pin holes 15, 16 may have a shape extending inward in the vehicle width direction toward the rear side of the vehicle.

Third Modification

Figure 9:
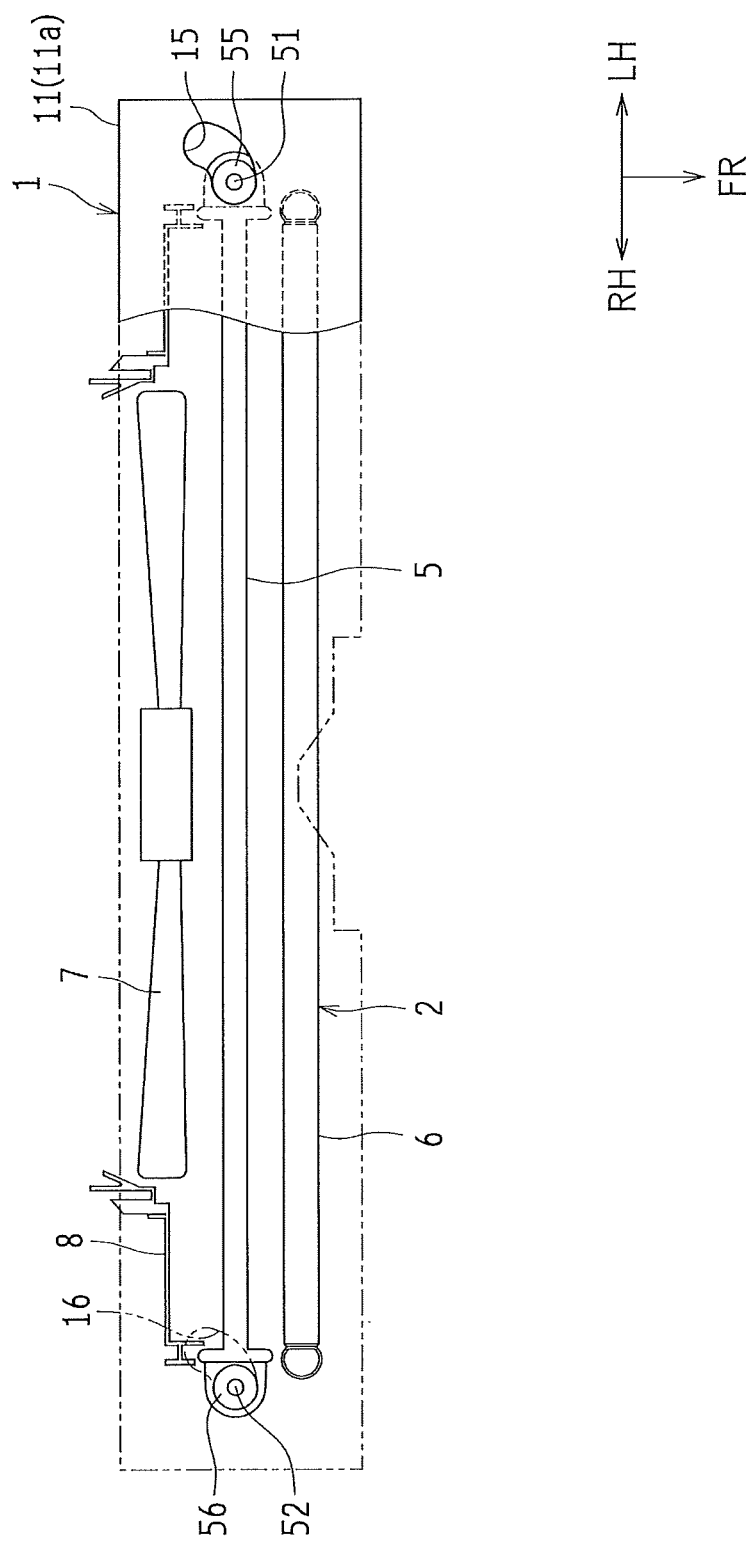
FIG. 9 is a view corresponding to FIG. 2 according to a third modification.
Figure 10:
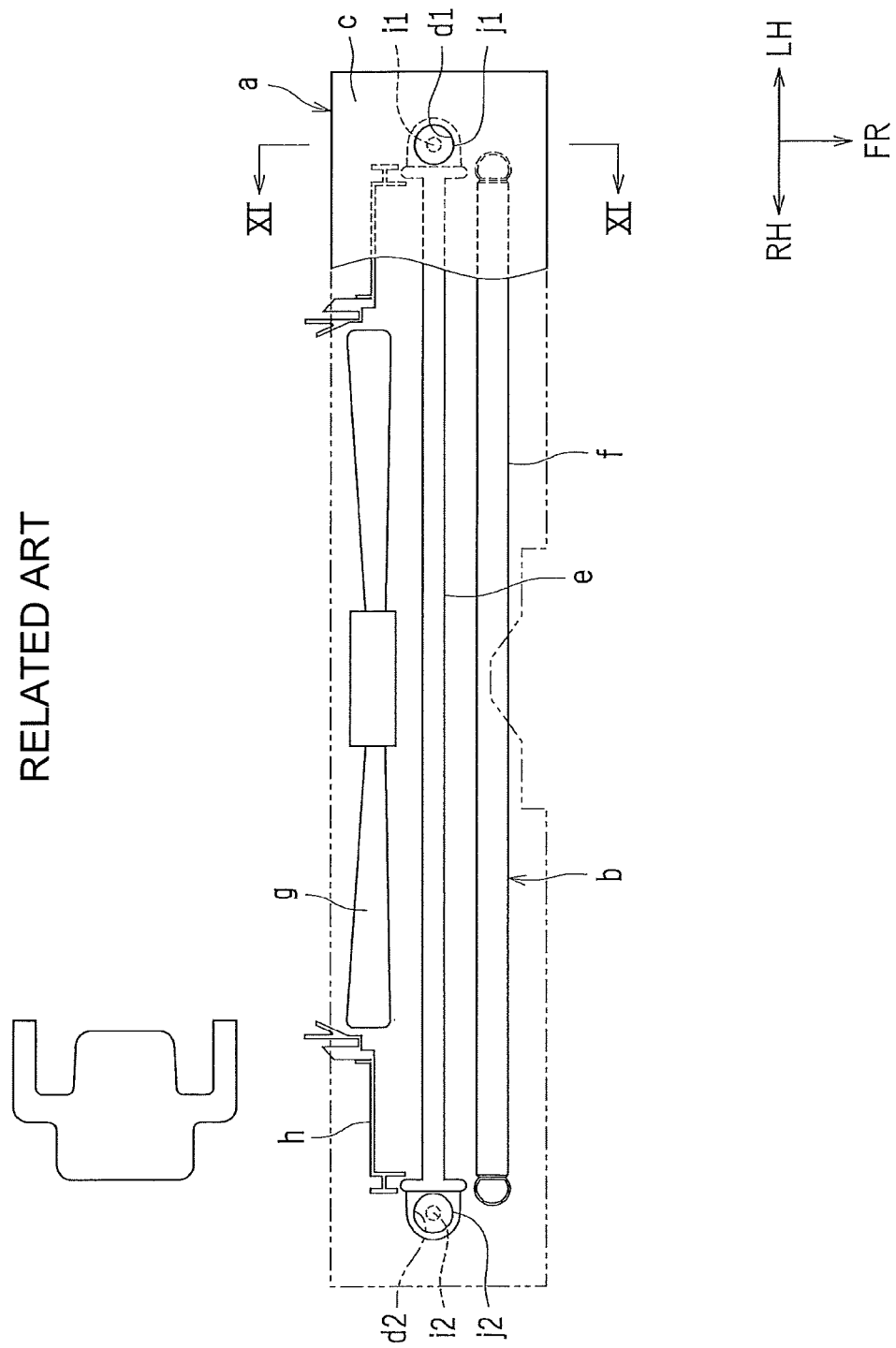
FIG. 10 is a view corresponding to FIG. 2 according to a related art.
Figure 11:
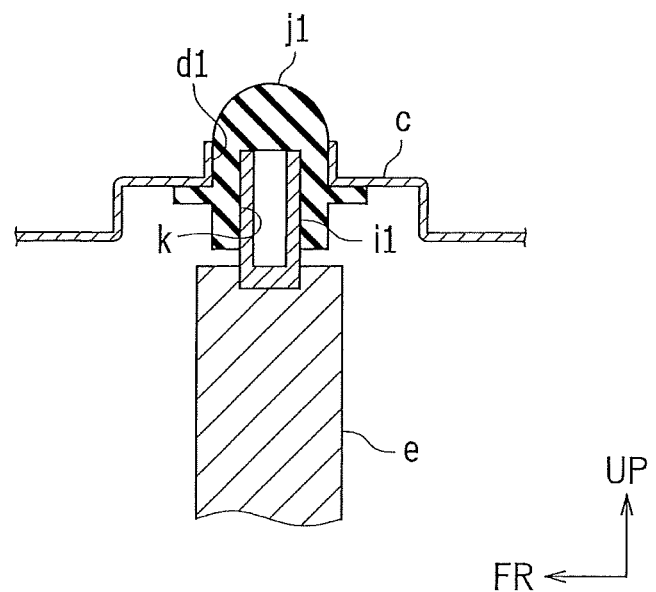
FIG. 11 is a sectional view taken along a line XI-XI in FIG. 10.
Figure 12:
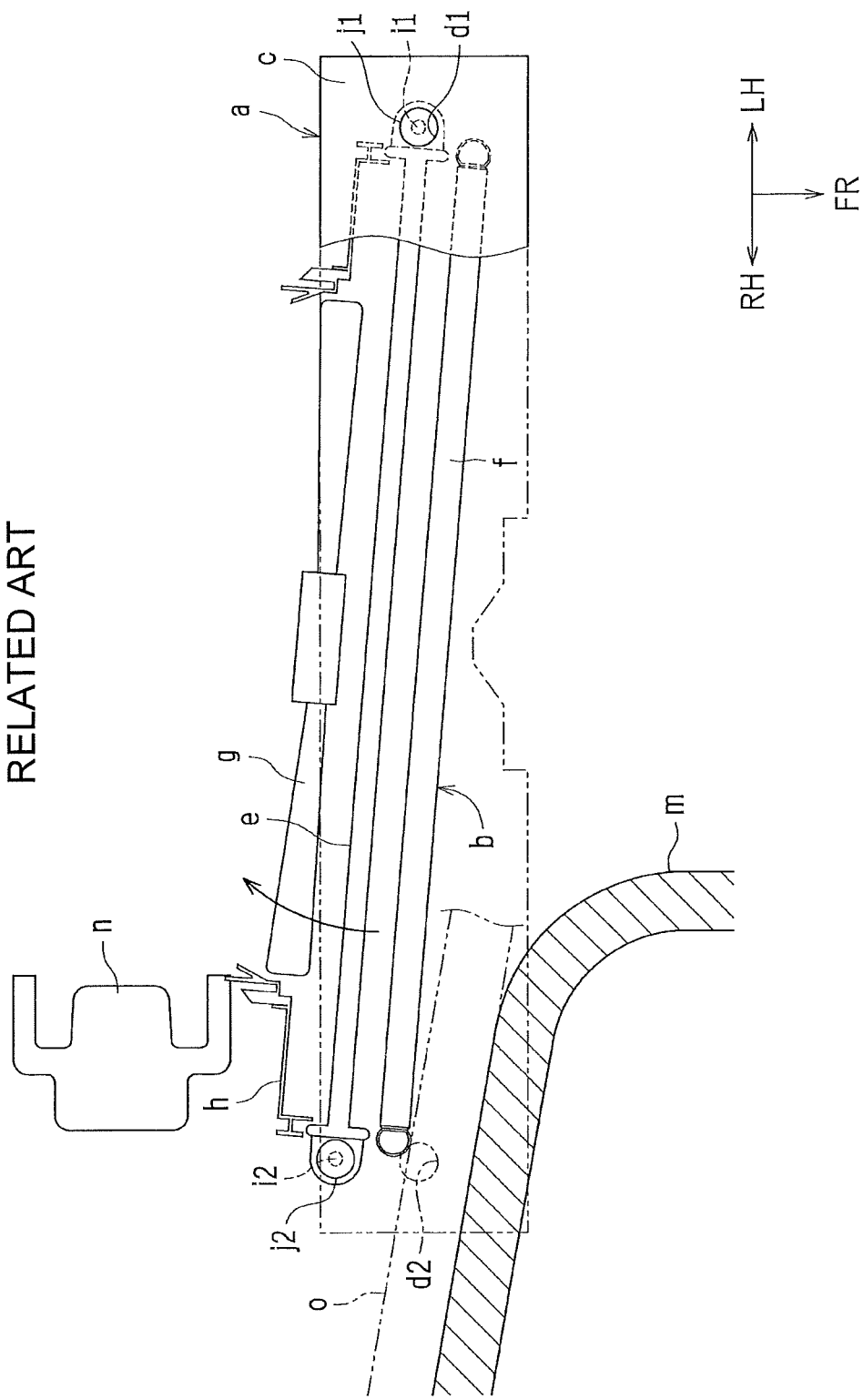
FIG. 12 is a view corresponding to FIG. 5 according to the related art.

Next, a third modification of the pin holes 15, 16 will be described. In the present modification, as illustrated in FIG. 9, the pin holes 15, 16 have a shape extending toward the rear side of the vehicle in the same direction in the vehicle width direction from the positions where the pins 51, 52 are inserted in the state where the cooling module 2 is supported by the radiator support 1. As in the second modification, the pin holes 15, 16 have a shape that curves with respect to the vehicle width direction toward the rear side of the vehicle.

The pin holes 15, 16 illustrated in FIG. 9 have a shape that curves with respect to the vehicle width direction toward the rear side of the vehicle. However, the pin holes 15, 16 may have a shape extending linearly as in the embodiments and the first modification.

Other Embodiments

The present disclosure is not limited to the embodiments and modifications described above, and various modifications and changes can be made within the scope of the claims and the equivalent range thereof.

For example, in the embodiments and modifications described above, of the pin holes 15, 16 formed in the radiator upper support 11 and the radiator lower support 12, the two pin holes 15 formed on the left side in the vehicle width direction have the same shape. Similarly, of the two pin holes 15, 16 formed in the radiator upper support 11 and the radiator lower support 12, the two pin holes 16 formed on the right side in the vehicle width direction have the same shape. However, the present disclosure is not limited thereto. The two pins formed on the left side in the vehicle width direction may have different shapes, and the two pins formed on the right side in the vehicle width direction may have different shapes. Alternatively, the present disclosure may be applied to the pin holes on only one side in the vehicle width direction. In other words, the pin holes on only one side in the vehicle width direction may have a shape extending toward the rear side of the vehicle in the vehicle width direction The present disclosure can be applied to a structure in which a cooling module mounted on a vehicle is supported by a radiator support.

What is claimed is:

1. A cooling module supporting structure comprising:
   a radiator support in which pin holes are formed on opposite sides in a vehicle width direction; and
   a cooling module in which pins are mounted in a vertical direction such that the pins protrude from the cooling module, wherein
   each pin is inserted through corresponding one of the pin holes such that the cooling module is supported by the radiator support, and
   at least one pin hole of the pin holes has a shape extending toward a rear side of a vehicle in the vehicle width direction from a position where the pin is inserted in a state where the cooling module is supported by the radiator support,
   wherein the pin hole has a shape that curves with respect to the vehicle width direction toward the rear side of the vehicle from the position where the pin is inserted in the state where the cooling module is supported by the radiator support.

2. The cooling module supporting structure according to claim 1, wherein the pin hole has a shape extending outward in the vehicle width direction toward the rear side of the vehicle from the position where the pin is inserted in the state where the cooling module is supported by the radiator support.

3. The cooling module supporting structure according to claim 1, wherein the pin hole has a shape extending inward in the vehicle width direction toward the rear side of the vehicle from the position where the pin is inserted in the state where the cooling module is supported by the radiator support.

4. The cooling module supporting structure according to claim 1, wherein each of the pin holes has a shape extending toward the rear side of the vehicle in directions opposite to each other in the vehicle width direction from the position where the pin is inserted in the state where the cooling module is supported by the radiator support.

5. The cooling module supporting structure according to claim 1, wherein each of the pin holes has a shape extending toward the rear side of the vehicle in the same direction in the vehicle width direction from the position where the pin is inserted in the state where the cooling module is supported by the radiator support.

* * * * *